United States Patent [19]

Takayama et al.

[11] Patent Number: 4,587,580
[45] Date of Patent: May 6, 1986

[54] VIDEO SIGNAL REPRODUCING APPARATUS

[75] Inventors: Nobutoshi Takayama, Kawasaki; Hiroo Edakubo, Tokyo; Hiroyuki Takimoto, Yokohama, all of Japan

[73] Assignee: Canon Kabushiki Kaisha, Tokyo, Japan

[21] Appl. No.: 569,781

[22] Filed: Jan. 10, 1984

[30] Foreign Application Priority Data

Jan. 11, 1983 [JP] Japan ................................. 58-2641
Apr. 20, 1983 [JP] Japan ................................. 58-70592

[51] Int. Cl.⁴ .......................... G11B 5/45; G11B 5/56
[52] U.S. Cl. ......................................... 360/77; 360/65
[58] Field of Search ................................. 360/65, 77

[56] References Cited

U.S. PATENT DOCUMENTS 3,381,083  4/1968  Jensen et al. ........................... 360/65
4,443,822  4/1984  Furtner .................................. 360/67
4,497,000  1/1985  Terada et al. .......................... 360/70

Primary Examiner—George G. Stellar
Attorney, Agent, or Firm—Toren, McGeady, Stanger, Goldbert & Kiel

[57] ABSTRACT

The disclosed video signal reproducing apparatus reproduces a video signal from a recording medium having adjacent tracks which carry recordings of video signals and recordings of pilot signals with different frequencies superposed on the video signal. A reproducing head traces each of the tracks for reproducing a video signal. A signal processing arrangement obtains a tracking control signal in accordance with the pilot signals obtained from the reproducing head. A compensator compensates for the effect of the tracking control signal on the basis of the frequency characteristic of the reproducing head in the frequency band of the pilot signals.

24 Claims, 22 Drawing Figures

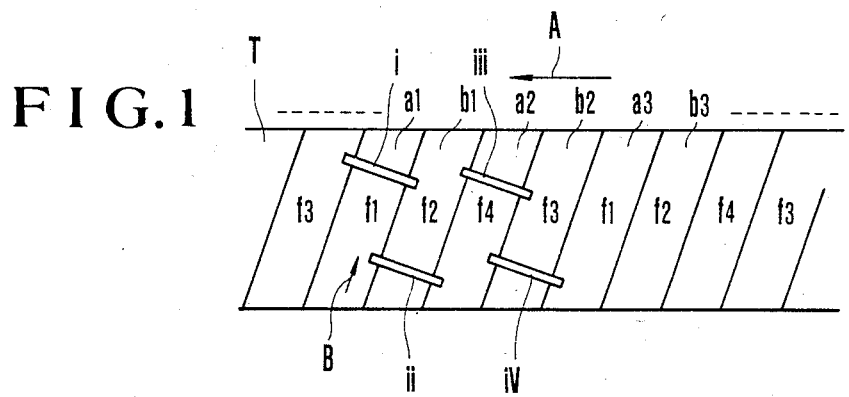
FIG.1
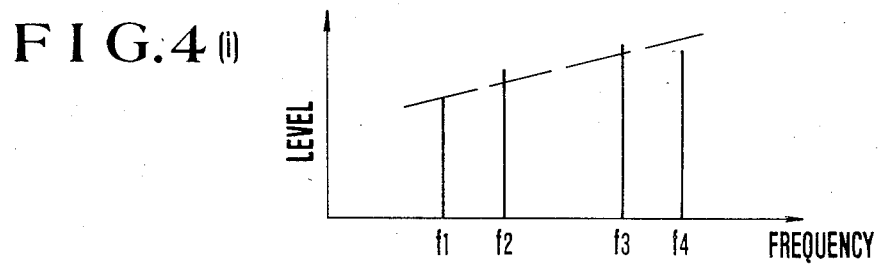
FIG.4 (i)
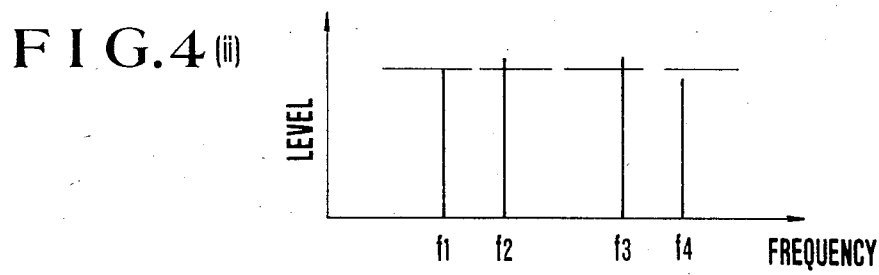
FIG.4 (ii)
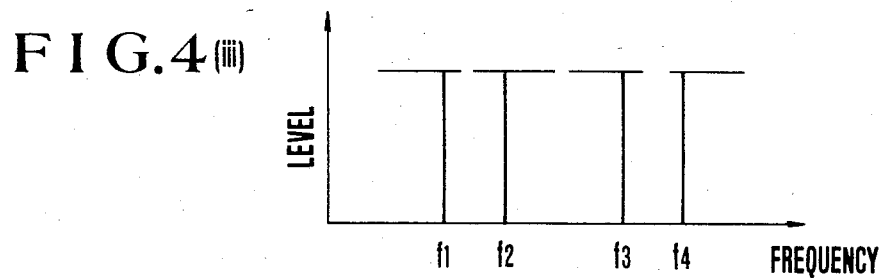
FIG.4 (iii)

FIG. 2(A)(i)
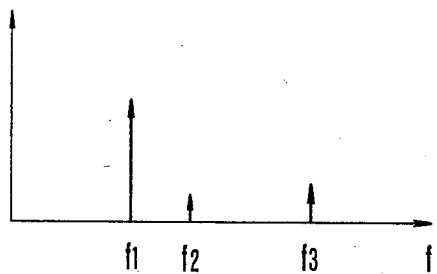
FIG. 2(B)(i)
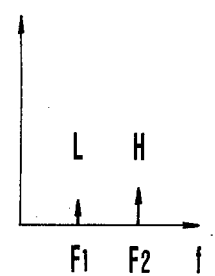
FIG. 2(A)(ii)
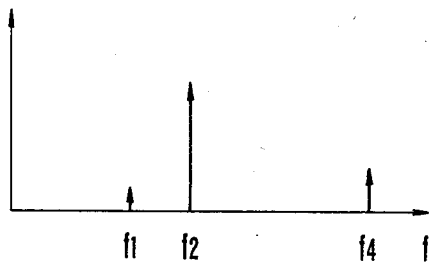
FIG. 2(B)(ii)
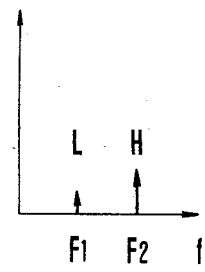
FIG. 2(A)(iii)
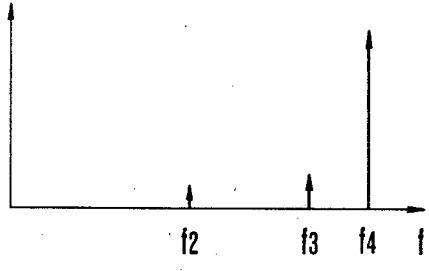
FIG. 2(B)(iii)
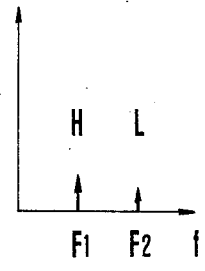
FIG. 2(A)(iv)
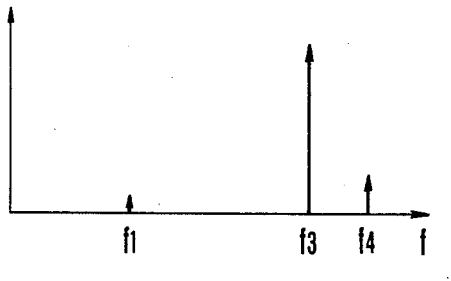
FIG. 2(B)(iv)
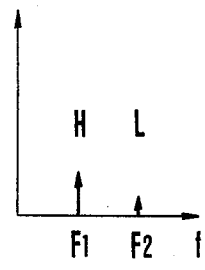

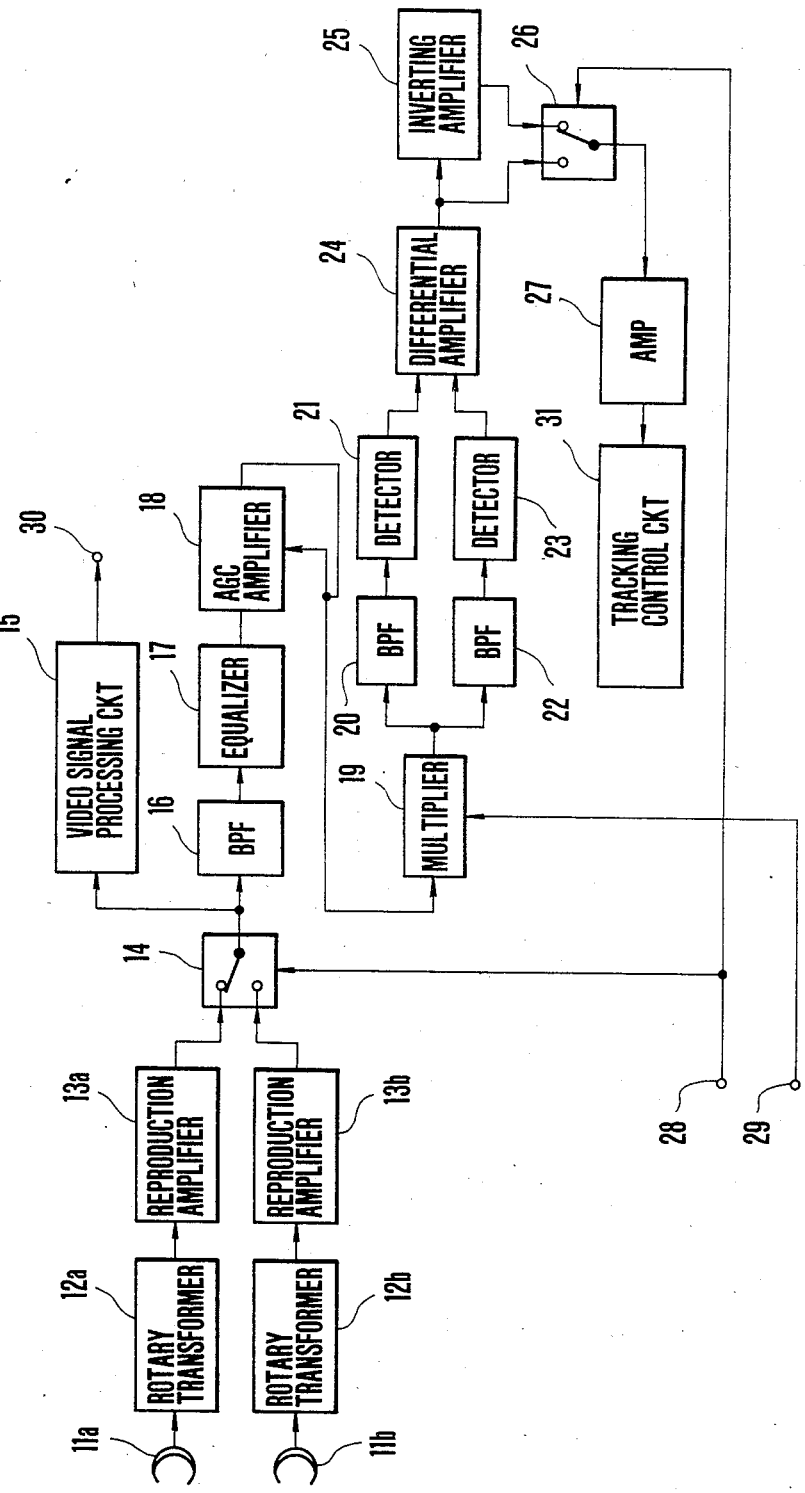

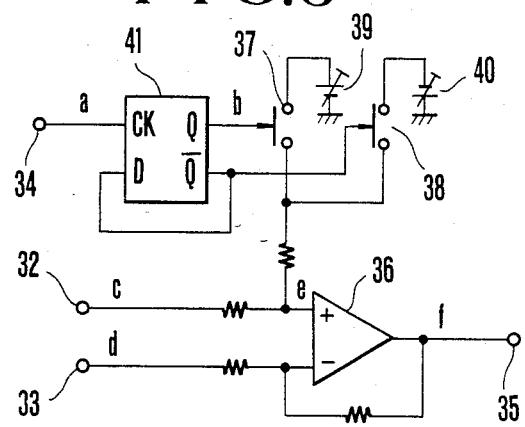
FIG.6
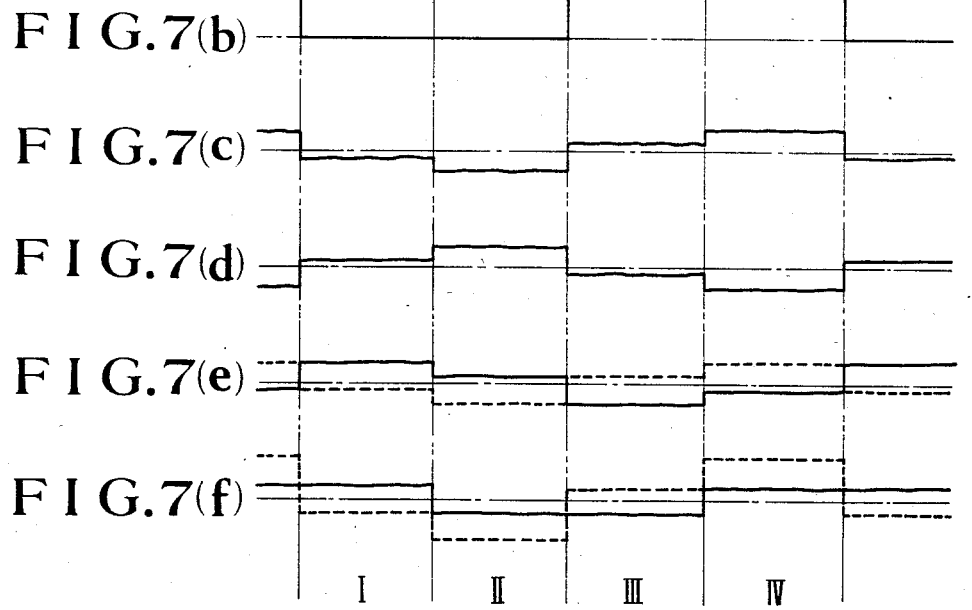
FIG.7(a)
FIG.7(b)
FIG.7(c)
FIG.7(d)
FIG.7(e)
FIG.7(f)
I  II  III  IV

VIDEO SIGNAL REPRODUCING APPARATUS

BACKGROUND OF THE INVENTION

1. Field of the Invention

The present invention relates to a video signal reproducing apparatus and more particularly to a video signal reproducing apparatus capable of automatically carying out a tracking control.

2. Description of the Prior Art

The present invention is described with reference to a magnetic recording and reproducing apparatus (hereinafter called a VTR) for recording a video signal on a magnetic tape.

Recent progress in high density technology has resulted in development of a VTR with narrowed track pitch. This enables long time recording and reproduction. When reproducing from tape on which the information is recorded with a narrow track pitch of this type, it is important that a reproducing head traces the track on the recorded tape correctly. Several tracking control methods have been proposed and some of them have been put into practice.

According to the conventional tracking control method a control signal (hereinafter called CTL) synchronized with a vertical synchronizing signal is recorded on a track exclusive for the CTL and separate from the video track. At the time of reproduction, the tracking control is carried out by means of the above CTL.

Quite recently, more interest has been aroused by a method which involves recording four different frequency signals (hereinafter called 4f pilot signals) on the four adjacent video tracks superposed on a video signal for one field to be recorded each on one track. At the time of reproduction a tracking control signal is obtained by the difference of reproduction levels of the 4f pilot signals from the two adjacent tracks of the video tracks to be reproduced so as to make the both reproduction levels equal. According to this method no fixed head is needed, nor is a track needed exclusive for the tracking signal. Further, the frequency characteristic of the thus obtained tracking control signal (hereinafter called ATF signal) is sufficient enough to control even tracking errors of relatively higher frequency components.

However, the ATF signal obtained from the above tracking control method using the 4f pilot signals is apt to cause a step shaped level fluctuation for each period corresponding to each field of the video signal (change-over cycle of the reproduction track). This arises because of the fluctuation of the reproduction levels of the 4f pilot signals due to the frequency characteristic of the reproducing head. Further, fluctuation of the recording level of the 4f pilot signals and also fluctuation of the 4f pilot signals takes place due to the tape used. Further, when a plurality of reproducing heads are used a step shaped level fluctuation takes place in the ATF signal owing to the fluctuation of the widths of the reproducing heads, the fluctuation of the mounting positions of the reproducing heads and so on.

Normally, carrying out tracking control at the time of reproduction involves a method for controlling the rotation phase of a capstan shaft with respect to a standard rotation phase of the rotary reproducing head. The frequency response characteristic of the capstan motor to be controlled is generally lower than several HZ. Hence the level fluctuation taking place for each field of the above ATF signal cannot be followed and the phase is controlled with the mean value.

Consequently, in the case of the helical scan VTR in which two reproducing heads are fixed on the rotary drum the tracking adjustment cannot be carried out for each reproducing head so that the influence of the noise component of the ATF signal ocurring from heads fixed diametrically causes mistracking. Further, level fluctuation of the reproduced 4f pilot signals also means level fluctuation of the amount of cross talk from the both adjacent tracks. Hence the difference between the both cross talks is used as the ATF signal so that the level fluctuation influences the tracking error detection sensitivity of the ATF signal and thus the gain of the capstan phase control loop fluctuates. This often destroys the stability of the tracking control.

SUMMARY OF THE INVENTION

It is accordingly an object of the present invention to provide a video signal reproducing apparatus free from the shortcomings of the conventional apparatus as mentioned above.

It is another object of the present invention to provide a video signal reproducing apparatus by means of which the level fluctuation of the tracking control signal owing to the frequency characteristic of the reproducing head is excluded and a superior tracking control signal can be obtained.

It is still another object of the present invention to provide a video signal reproducing apparatus by means of which the level fluctuation of the tracking control signal taking place for each change-over period of the reproduction track can be excluded.

In order to attain these objects the following embodiments are prepared according to the present invention.

A video signal reproducing apparatus for producing a video signal from a recording medium on whose adjacent tracks pilot signals with different frequencies superposed on the video signal are recorded, includes;

a reproducing head for tracing each of the tracks for reproducing a video signal;

signal producing means for obtaining a tracking control signal in accordance with the pilot signals obtained from the reproducing head; and means for compensating the influence given to the tracking control signal by the frequency characteristic of the reproducing head in the frequency band of the pilot signals.

Further objects and features of the present invention will become apparent from the following detailed description of the embodiments of the present inventor referring to the accompanying drawings.

BRIEF DESCRIPTION OF THE DRAWINGS

FIG. 1 shows the head tracking on the medium in a good condition.

FIGS. 2(A)(i)–(iv) and FIGS. 2(B)(i)–(iv) respectively show the reproduced pilot signals and the frequency spectrum of the corresponding signals in a good tracking condition.

FIG. 3 shows the control block diagram of an embodiment of the reproducing apparatus of the present invention.

FIGS. 4(i)–(iii) respectively show the frequency spectrum of the 4f pilot signals in the apparatus shown in FIG. 3 when the reproducing head is tracking in a good condition.

FIG. 6 shows an example of the signal processing circuit shown in FIG. 5.

FIGS. 7(a)–(f) respectively show the wave forms at each part in FIG. 6.

DETAILED DESCRIPTION OF THE PREFERRED EMBODIMENTS

Figure 5:
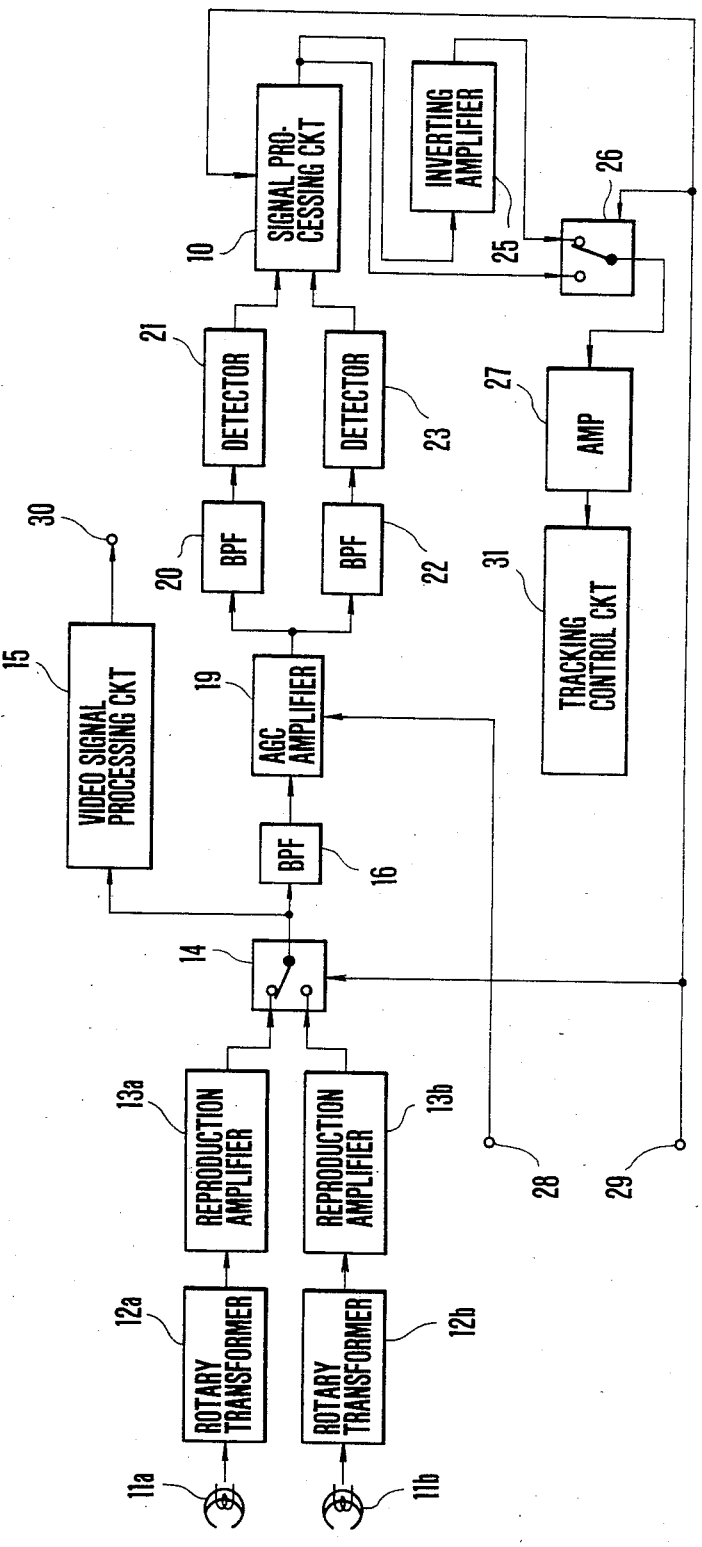
FIG. 5 shows the basic block diagram of another embodiment of the reproducing apparatus of the present invention.

Below, the principle of the present invention is explained in detail. FIG. 1 shows the head tracking the magnetic tape in good condition. Tracks an and bn, where n=1,2,..., have a composite signal consisting of 4f pilot signals superposed on a video signal, and an and bn are different in the magnetization direction. Frequencies f1, f2, f3 and f4 on the respective tracks are the frequencies of the pilot signals and superposed and recorded at the same level. The relationship among the frequencies is f1<f2<f3<f4. Further, in the drawing, i, ii, iii, and iv respectively show the state of the head tracking in a good condition on the track on which the pilot signals with frequencies f1, f2, f3 and f4 are recorded. It goes without saying that an and bn are different in the magnetization direction and traced by the head with the same azimuth angle as at the time of recording.

An arrow-A shows the running direction of the tape, while an arrow B shows the tracing direction of the head. The two reproduction heads successively trace the tracks in the order of a1, b1, a2, b2, a3 ... so as to reproduce the video signals. By setting the heads wide for the track pitch the pilot signals from the both adjacent tracks are also obtained.

FIGS. 2(A)(i), (ii), (iii) and (iv) respectively show the spectrum of the frequencies of the reproduction pilot signals with the head in the states i, ii, iii and iv in FIG. 1.

The reproduction pilot signals shown in FIGS. 2(A)(i), (ii), (iii) and (iv) are respectively multiplied by f1, f2, f4 and f3 so as to obtain the signals with the frequencies of their difference. FIGS. 2(B)(i), (ii), (iii) and (iv) respectively show the spectrum of the frequencies of the signals. Thereby F1=f2 f1=f4 f3, F2=f3 f1=f4 f2. By comparing the frequency components of F1 and those of F2 the tracking control signal is obtained.

However, even if the tracking is good, as shown in FIGS. 2(A)(i)–(iv), level difference takes place in the pilot signals owing to the above frequency characteristic of the reproduction head. The level difference takes place among the tracks to be reproduced and causes tracking shifted information. On the other hand, even if the recording levels are equal, in the frequency band (generally 100–200 KHz) of the pilot signals, the intensity of the reproduction power is generally in the order of f4>f3>f2>f1. Therefore, when the track on which f1 is recorded is traced and when the track on which f2 is recorded is traced, as shown in FIGS. 2(B)(i) and (ii), more F2 component is obtained than F1 component, while when the track on which f4 is recorded is traced and when the track on which f3 is recorded is traced, as shown in FIGS. 2(B)(iii) and (iv), more F2 component is obtained than F1 component.

Below, the present invention will be explained in detail with reference to the embodiments of the present invention.

FIG. 3 shows a basic block diagram of an embodiment of the video signal reproducing apparatus of the present invention. In the drawing reproduction heads 11a and 11b are diametrically mounted on a rotary drum (not shown in the drawing) in order to reproduce the video signals recorded on the tape tracks and the 4f pilot signals superposed on the above signals. Rotary transformers 12a and 12b extract the signals reproduced by the reproduction heads 11a and 11b from the rotary drum. Amplifiers 13a and 13b are pre-arranged reproduction amplifiers. A change-over switch 14 switches a line for obtaining the reproduction signal in order to carry out the reproduction when the reproduction heads 11a and 11b are scanning the tape. A video signal processing circuit 15 demodulates the video signal among the reproduction signals from the change-over switch 14. A band pass filter 16 extracts the 4f pilot signals from the reproduction signals. A frequency equalizer 17 compensates the basic characteristics of the reproduction heads 11a and 11b, particulaly the frequency characteristics in the frequency band of the above 4f pilot signals. An automatic gain control amplifer 18 (hereinafter called AGC amplifier) keeps a level reproduction output, namely the peak value of the 4f pilot signals of the track from which the video signal is reproduced (the track which the reproduction heads mainly trace). A multiplier 19 multiplies the reproduced 4f pilot signals with the 4 frequency signals (to be applied via a terminal 29) oscillating with the same frequency rotation (f1, f2, f4, f3, f1 ... ) as that of the 4f pilot signals. When the relation among the frequencies f1, f2, f3, f4 of the 4f pilot signals is f1<f2<f3<f4, the setting is made in such a manner that f2−f1=f4−f3=F1 and f4−f2=f3−f1=F2. A band pass filter 20 extracts only the frequency component near the frequency F1. A band pass filter 22 takes out only the frequency component near the frequency F2. Respective detecting circuits 21 and 23 detect the frequencies F1 and F2. A change-over switch 26 switches between a output of the differential amplifier 24 and the output of an inverting amplifier 25 in accordance with a head change-over pulse. An amplifier 27 amplifies the output of the switch 26. An input terminal 28 of the head change-over pulse serves for showing that the reproduction heads 11a and 11b are changed over. An input terminal 29 of the 4 frequency signals, 30 an output terminal of the reproduced video signal and a tracking control circuit 31 controls the drive of the tape scanning system such as the reproduction heads or the capstan motor by the output of the AFT signal.

The operation of the apparatus shown in FIG. 1 is as follows.

The video tape (not shown in the drawing), has a track formed for each field of the video signal as illustrated in FIG. 1. Each track has pilot signals with the frequencies f1, f2, f4, f3 successively recorded thereon and superposed on the video signal. The signal reproduced by the reproduction heads 11a and 11b is applied to the video signal processing circuit 15 and the band pass filter via the rotary transformers 12a and 12b, the reproduction amplifiers 13a and 13b and the change-over switch 14. The video signal processing circuit 15 demodulates the video signal component in the reproduced signal to form the reproduced video signal and delivers the latter to a device such as a TV image receiving apparatus etc.

Of the reproduced signal only the 4f pilot signals in the frequency band of the band pass filter 16 are passed by the filter 16 and delivered to one input terminal of the multiplier 19 via the equalizer 17 and the AGC amplifier 18. The other input terminal of the multiplier 19 receives the frequency signal oscillating at the same frequency rotation as that of the reproduced 4f pilot signals. Therefore, the multiplier 19 produces signals with differences F1 and F2 between the signals with the oscillating frequency and that of the cross talk component of the reproduced pilot signal. The signal near the frequency F1 is obtained by the band pass filter 20 and the signal near the frequency F2 is obtained by the band pass filter 22 and those are detected respectively by the detecting circuits 21 and 23.

Then, the outputs of the detecting circuits 21 and 23 are amplified by the differential amplifier 24. The output of the differential amplifier 24 and the output inverted by the inverting amplifier 25 are alternatively delivered to the amplifier 27 so as to obtain the AFT signal. The ATF signal output is delivered to the tracking control circuit 31 in order to control the drive of the capstan motor (not shown in the drawing) so as to control the tracking of the head.

FIGS. 4(i)–(iii) show respective frequency spectra of the reproduction levels of the 4f pilot signals from the tracks (which are mainly traced by the reproduction heads) on which the reproduction heads are tracking properly so as to reproduce the video signal. FIG. 4(i) shows the output of the band pass filter, FIG. 4(ii) shows the output of the equalizer 17 and FIG. 4(iii) shows the output of the AGC amplifier 18.

In FIG. 4(i) the levels of the reproduced 4f pilot signals passed by the band pass filter 16 are not equal for each field, namely for each track, owing to the frequency characteristic of the recording and reproducing heads, the differences in the efficiencies of the reproducing heads, and the frequency characteristic of the video tape used. Further, although not shown in the drawing, the levels of the pilot signals from the two adjacent tracks of the tracks from which the video signals are reproduced are different owing to the above reason, the difference between the widths of the two reproducing heads, and the difference in the mounting positions.

Of the above level differences, that owing to the frequency characteristic of the recording and the reproducing head and that arising from the video tape are compensated for as shown in FIG. 4(ii), by the equalizer 17 having a frequency characteristic opposed to the above frequency characteristic shown by a dotted line in FIG. 4(i)).

Accordingly, in case the tracking slips, the reproduction level of the 4f pilot signals from the tracks adjacent to the reproduction track is compensated by the equalizer 17 so as to compensate the above frequencies characteristic in order to obtain a proper tracking signal.

Further, the level difference owing to the difference between the widths of the reproducing heads 11a and 11b, deviation of the position, the difference between the efficiencies of the reproducing heads, etc. is compensated for by the AGC amplifier 18, as shown in FIG. 4(iii) so that the reproduction level becomes equal to the AGC level.

This construction prevents change of the D.C. level or the gain of the ATF signal for each track and good tracking is always possible.

In the present embodiment the output of the equalizer is connected to the AGC amplifier. However, it is also possible to connect the output of the AGC amplifier to the equalizer. Also, the AGC amplifier and the equalizer may form one amplification circuit. Further, as compensation means for compensating the frequency characteristic in the frequency band of the pilot signals besides the equalizer, each frequency of the pilot signals is separately taken out and amplified by the amplifier with different gain.

FIG. 5 shows the block diagram of another embodiment of the video signal reproducing apparatus. The members having the same numerals as those in FIG. 3 are the same members, and their explanations are omitted. A signal processing circuit 10 includes a differential amplifier for obtaining the ATF signal from the output of the detecting circuits 21 and 23.

FIG. 6 shows an example of the signal processing circuit 10 shown in FIG. 5. The frequency components F1 and F2 detected in envelope by the detecting circuits 21 and 23 are delivered to the differential amplifier 36 via the terminals 32 and 33. FIGS. 7(a)–7(f) respectively show the wave forms at the parts a-f in FIG. 6. In FIGS. 7(a)–7(f), I, II, III and IV respectively show the time during which mainly the tracks on which the pilot signals having the frequencies f1, f2, f4 and f3 are superposed are traced.

As already mentioned, the frequency component f0 delivered from the detecting circuit 21 to the terminal 32 has the level fluctuation as shown in FIG. 7(c) even in case the trackng is carried out in a good condition. The frequency component delivered from the terminal 33 to the detecting circuit 23 has the level fluctuation as shown in FIG. 7(d). When they are delivered to the differential amplifier 36 the output f has to be 0 in case the tracking is carried out in a good condition. However, as shown in a dotted line in FIG. 7(f), the large fluctuation takes place in each field.

As clear from the dotted line in FIG. 7(f) during the times I and II, the output f of the differential amplifier 36 deviates to the negative side, while during the times III and IV it deviates to the positive side. This will be clear from the explanation for FIGS. 2(A)(i)–(iv) and FIGS. 2(B)(i)–(iv). Thus, in the present embodiment during the times I and II a positive reference voltage is added from the power source 39 to the positive input of the differential amplifier 36, while during the times III and IV a negative reference voltage is added from the power source 40. In this way, the positive input of the differential amplifier 36 changes to the input shown by the signal line in FIG. 7(e) from the input shown by the dotted line. Therefore, the output of the differential amplifier 36 changes to the output shown by the single line in FIG. 7(f) from the dotted line. By differential adding a different reference voltage to the input of the amplifier 36 for each two fields in synchronism with the change-over of the track, the error signal owing to the frequency characteristic of the reproducing head for the frequencies of the pilot signals is lowered.

The change-over timming of the reference voltage occurs as follows. A terminal 34 passes the head change-over pulse to a D type flip-flop 41. In case the head change-over pulse has the wave form shown in FIG. 7(a), the flip-flop 41 is triggered with the falling edge and the resulting pulse has the wave form shown in FIG. 7(b). Analog switches 37 and 38 are controlled by the positive output and the inverted output of the flip-flop 41. Thus, during the times I and II the reference voltage is obtained from the power source 40, while during the times III and IV the voltage is obtained from the power source 39.

As is well known, the signal processing circuit 10 is a circuit for detecting one of the adjacent tracks whose cross talk component is more than the other by the output of the differential amplifier 36 so as to relatively move the head toward the direction of the track whose cross talk component is less. However, the directions of the adjacent tracks producing the 3f0 component and the f0 component are different for each track traced so that the output of the signal processing circuit 10 and the output inverted by the inverting amplifier 25 are changed over by the change-over switch 26 for each track.

Then, the DC level gain of the thus obtained ATF signal is converted by the output amplifier 27 and then delivered to the tracking output circuit 31 so as to control the tracking. The method for controlling the track involves using a method for controlling the rotation of the capstan so as to control the running of the tape or a method for controlling the head in the rotary down by an electric - mechanical converting element such as a bimorph plate.

The above construction compensates for the error fluctuation of the ATF signal owing to the level difference of the reproduced pilot signals and stabilizes tracking in a very simple construction.

Figure 8:
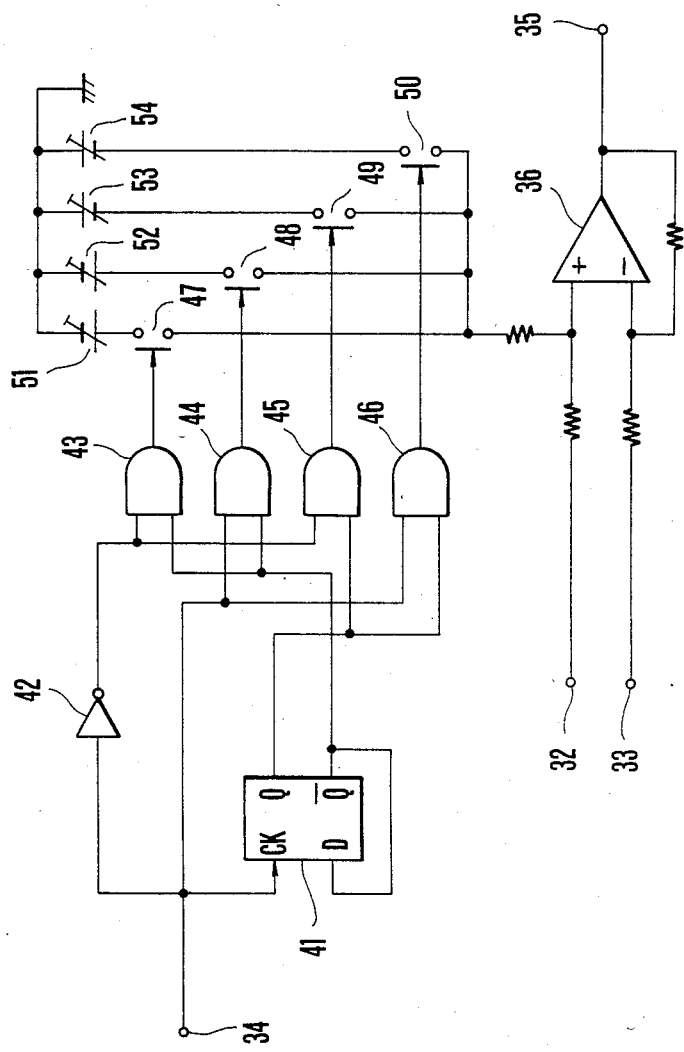
FIG. 8 shows another example of the signal processing circuit shown in FIG. 5.

FIG. 8 shows another example of the signal processing circuit 10 in FIG. 5. The members having the same numerals as those in FIG. 6 are the same members.

During the time I in FIGS. 7(a) to 7(f) the level of the output of the head change-over pulse delivered from the terminal 34 is low and that of the output of the flip-flop 41 is also low. Thus, the level of the output of the inverter 42 is high and that of the inverting output of the flip-flop 41 is high so that the level of the output of the AND gate 43 is high so as to turn the analog switch 47 on. Thus, the reference voltage is delivered from the power source 51 to the positive input of the differential amplifier 36. In the same way, during the times II, III and IV in FIGS. 7(a)–7(f), the levels of the outputs of the AND gates 44, 45 and 46 are high and the analog switches 48, 49 and 50 are turned on so that the reference voltages are delivered from the power sources 52, 53 and 54 respectively.

The, the power sources 51, 52, 53 and 54 deliver the reference voltages for a small positive direction, a large positive direction, a small negative direction and a large negative direction respectively. Thus, in case the tracking is carried out in a good condition it is possible that the positive input of the differential amplfier 36 coincides with the negative input. Consequently, the signal processing circuit of this construction can completely compensate for the error fluctuation of the ATF signal in accordance with the level difference owing to the frequency characteristics of the reproduced pilot signals, it is further possible to carry out the stabilized tracking control.

Although all of the above explanation refers to the embodiment of the present invention as applied to a VTR, the present invention is applicable to any apparatus for reproducing the video signal from the medium on whose adjacent racks the pilot signals successively having different frequencies are superposed on the video signal and recorded.

What we claim:

1. A video signal reproducing apparatus for reproducing a video signal from a recording medium having adjacent tracks with recordings of video signals and recordings of pilot signals of different frequencies superposed on the video signal, comprising:
a reproducing head for tracing each of the tracks for reproducing a video signal, said head having a given frequency characteristic;
signal processing means for obtaining a tracking control signal in accordance with pilot signals obtained from said reproducing head; and
means for compensating for the influence on the tracking control signal of the frequency characteristic of said reproducing head in the frequency band of the pilot signals.

2. An apparatus according to claim 1, wherein said compensating means is arranged to deliver the pilot signals obtained from said reproducing head to said signal processing means.

3. An apparatus according to claim 2, wherein said compensating means includes an equalizer.

4. An apparatus according to claim 2, further comprising: automatic gain control means for keeping constant a peak value of the pilot signals obtained from said reproducing head.

5. An apparatus according to claim 4, wherein said gain control means is arranged to deliver the pilot signals obtained via said compensating means to said signal processing means.

6. An apparatus according to claim 1, wherein said compensating means is arranged to control said signal processing means.

7. An apparatus according to claim 6, wherein said signal processing means includes a plurality of detectors for obtaining outputs each corresponding to levels of pilot signals obtained from both tracks adjacent to a main track traced by said reproducing head and a comparator for comparing the outputs of the detectors.

8. An apparatus according to claim 7, wherein said compensating means is arranged to control said comparator.

9. An apparatus according to claim 8, wherein said compensating means includes a circuit for adjusting one of the outputs of said detectors to be delivered to said comparator.

10. An apparatus a-cording to claim 6, wherein said compensating means is arranged to carry out the control in synchronism with the change-over of reproduction tracks by said reproducing head.

11. An apparatus according to claim 1, wherein said recording medium is a magnetic tape and said reproducing head is arranged to trace the magnetic tape obliquely.

12. An apparatus according to claim 11, further comprising: tracking control means for controlling the running of the magnetic tape in accordance with the tracking control signal.

13. An information signal reproducing apparatus for reproducing information signals from recording tracks formed on a recording medium, each of said recording tracks having one of a plurality kinds of pilot signals of different frequencies, comprising:
(a) reproducing means including a reproducing head for tracing the tracks for reproducing information signals;
(b) frequency equalizing means for the pilot signals reproduced by said reproducing means; and
(c) signal processing means for obtaining a tracking control signal in accordance with pilot signals frequency equalized by said frequency equalizing means.

14. An apparatus according to claim 13, wherein said signal processing means includes a gain control circuit operative to maintain a constant peak level of the output signal of said frequency equalizing means.

15. An apparatus according to claim 14, wherein said signal processing means forms said tracking control signals using pilot signals other than the pilot signal whose peak level is maintained constant by said automatic gain control signal.

16. An information signal reproducing apparatus for reproducing information signals from recording tracks formed on a recording medium, on each of which tracks pilot signals having "n" different kinds of frequency are cyclically recorded together with an information signal, comprising:
 (a) reproducing means including a reproducing head for tracing the tracks for reproducing information signals and for obtaining pilot signals;
 (b) signal processing means for obtaining a tracking control signal in accordance with pilot signals obtained from said reproducing means; and
 (c) control means for changing processing characteristics of said signal processing means for each cyclic period in which said reproducing means reproduces "n" tracks.

17. An apparatus according to claim 16, wherein said signal processing means includes a plurality of detectors for obtaining outputs each corresponding to levels of pilot signals obtained from tracks adjacent to a track being traced by said reproducing head and a comparator for comparing the outputs of the detectors.

18. An apparatus according to claim 17, wherein said control means includes a circuit for selecting D.C. values to be added to one of the outputs of the detectors to be delivered to said comparator.

19. An apparatus according to claim 18, wherein said selecting circuit is arranged to select one of two values of D.C.

20. An apparatus according to claim 19, wherein said selecting circuit is arranged to perform a selecting operation corresponding to the kind of pilot signals obtained from a reproduction track.

21. An apparatus according to claim 20, wherein said selecting circuit is arranged to switch over the D.C. value to be selected every time when said reproducing head traces two tracks.

22. An apparatus according to claim 18, wherein said selecting circuit is arranged to select one kind of D.C. value out of "n" kinds of D.C. values.

23. An apparatus according to claim 22, wherein said selecting operation of said selecting means correspond to the kind of pilot signals obtained from a track being traced by said reproducing head.

24. An information signal reproducing apparatus for reproducing information signals from a recording medium with adjacent tracks having recordings of video signals and recordings of pilot signals with different frequencies superposed on the information signals, comprising:
 (a) a reproducing head for tracing the tracks for reproducing information signals and for reproducing pilot signals;
 (b) signal processing means for obtaining a tracking control signal in accordance with pilot signals obtained from said reproducing head;
 (c) adding means for adding D.C. values to the tracking control signal obtained from said signal processing means; and
 (d) change-over means for changing over the level of said D.C. values in synchronism with the change-over of tracks by said reproducing head.

* * * * *